T. J. DOYLE.
EDUCATIONAL AND AMUSEMENT DEVICE.
APPLICATION FILED OCT. 6, 1917.
1,321,292.
Patented Nov. 11, 1919.
2 SHEETS—SHEET 1.
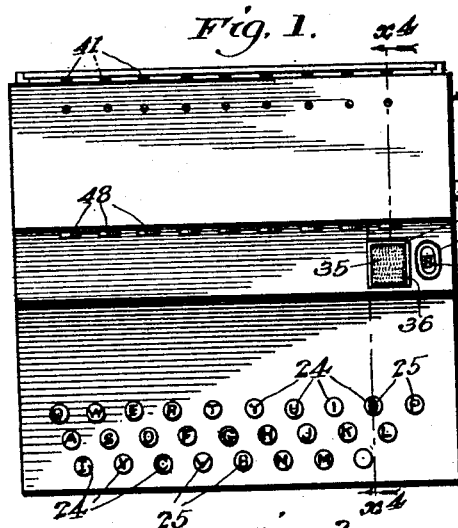
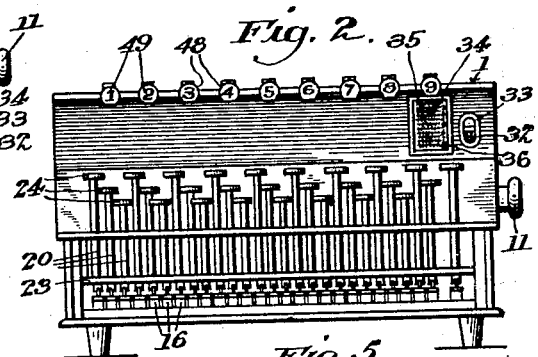
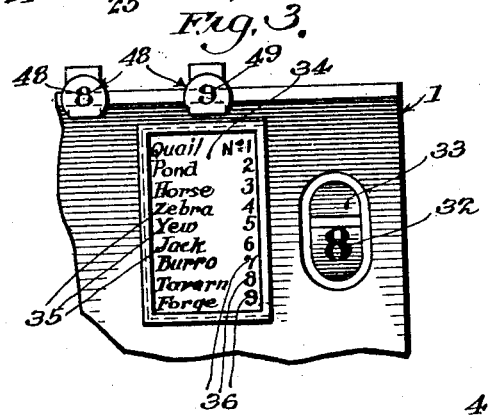
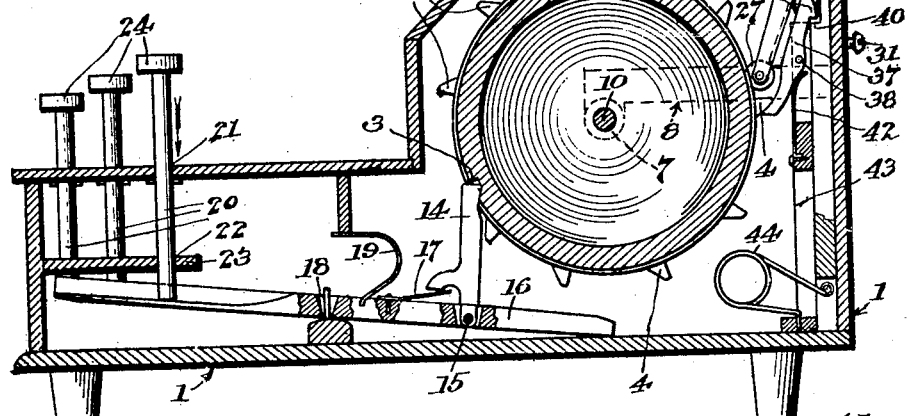

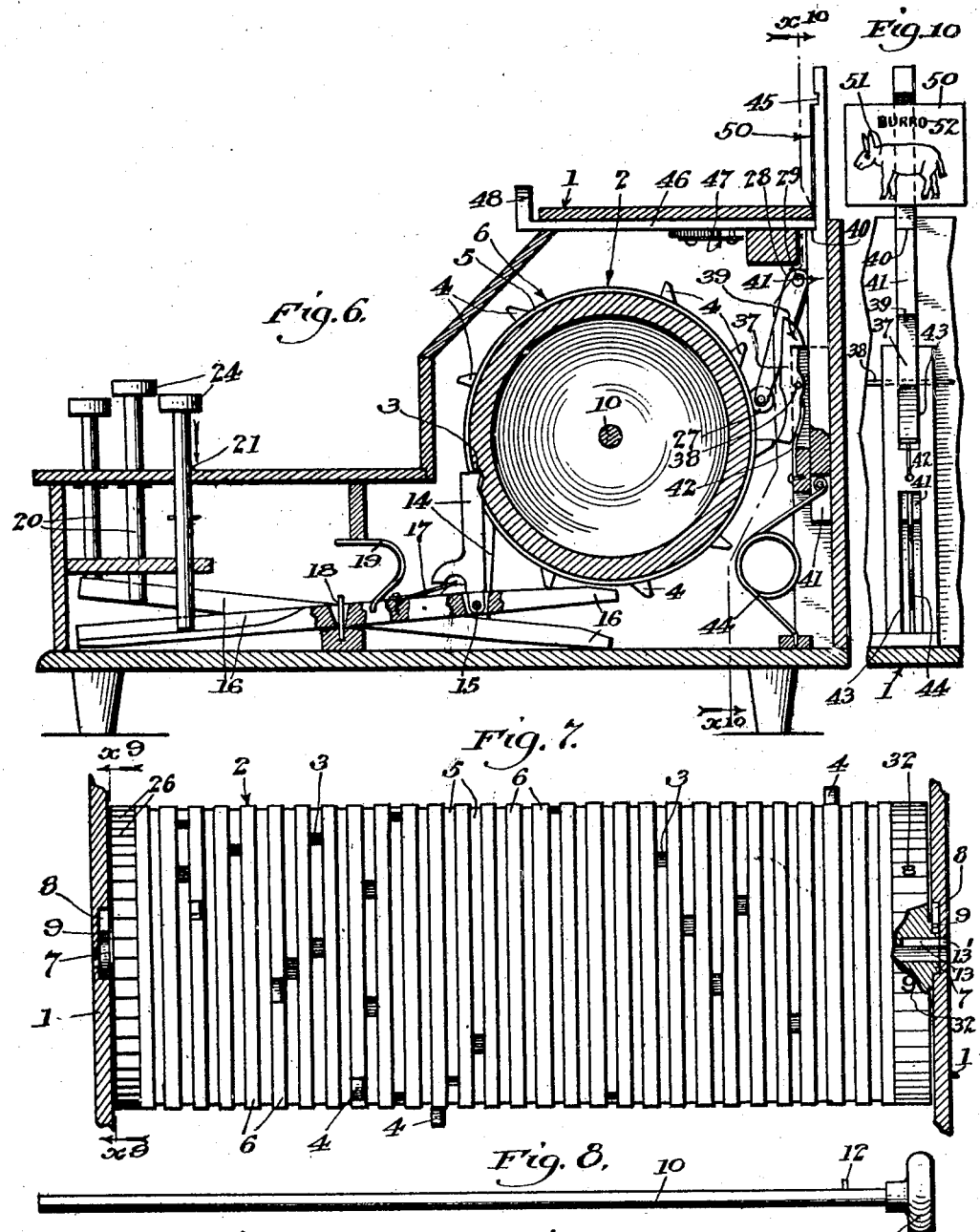

UNITED STATES PATENT OFFICE.

THOMAS J. DOYLE, OF LOS ANGELES, CALIFORNIA.

EDUCATIONAL AND AMUSEMENT DEVICE.

1,321,292.   Specification of Letters Patent.   Patented Nov. 11, 1919.

Application filed October 6, 1917. Serial No. 195,138.

*To all whom it may concern:*

Be it known that I, THOMAS J. DOYLE, a citizen of the United States, residing at Los Angeles, in the county of Los Angeles and State of California, have invented a new and useful Educational and Amusement Device, of which the following is a specification.

An object of this invention is to provide an aid to students in the spelling of words.

Another object is to familiarize the students using the device with the usual typewriter keyboard so that the student can readily learn to write on a typewriter after having used the device for preliminary training.

Another object is to make the study of spelling interesting for young children.

Other objects and advantages will appear in the subjoined detail description.

The accompanying drawings illustrate the invention:

Figure 1 is a plan view of the invention.

Fig. 2 is a front elevation of Fig. 1.

Fig. 3 is an enlarged detail of the upper right-hand corner of Fig. 2.

Fig. 4 is an enlarged vertical section on line indicated by $x^4-x^4$, Fig. 1.

Fig. 5 is a sectional detail of the pawl and ratchet for yieldingly holding the cylinder against turning.

Fig. 6 is a sectional elevation analogous to Fig. 4 excepting that some of the operating parts are in different positions than in Fig. 4.

Fig. 7 is a plan view of the cylinder, a portion thereof being broken away for clearness of illustration and fragments of the ends of the cabinet being shown in section.

Fig. 8 is a view of the operating handle.

Fig. 9 is an elevation on line $x^9-x^9$, Fig. 7, the cylinder boss being shown in section on said line.

Fig. 10 is a fragmentary elevation on line indicated by $x^{10}-x^{10}$, Fig. 6.

There is provided a cabinet 1 of any suitable construction and mounted in said cabinet is a step-motion member 2 of any desired form and in the instance shown is in the form of a cylinder and provided at certain portions of its surface with notches 3 and at the other portions with lugs forming abutments 4. It is desirable, though not absolutely essential, to form the notches 3 in the bottoms of annular grooves 5 and to mount the lugs 4 on ribs 6 which separate the grooves from one another. The grooves 5 and ribs 6 alternate along the cylinder to within a short distance of each end. The opposite ends of the cylinder 2 are provided with bosses 7 accommodated in grooves 8 in the ends of the cabinet, said grooves having their outer ends extending through the rear edges of the ends of the cabinet and having their inner ends bent downward so that the cylinder can readily be placed in and removed from its operative position. Springs 9 fastened to the ends of the cabinet rest upon the bosses so as to hold the bosses in the bent end of the groove. An operating device is provided for the cylinder and comprises a shaft 10 extending through the cylinder and having its ends journaled in the ends of the cabinet and also comprises a knob or handle 11 whereby the shaft may be turned. The shaft 10 is provided with a pin 12 to engage a slot or keyway 13 at one end of the cylinder so as to key the shaft to said cylinder, and the adjacent end wall of the cabinet is provided with a slot 13' so that the pin 12 can be withdrawn from the slot 13 when it is desirable to remove the shaft 10 and cylinder 2.

In the grooves 5 rest the upper ends of detents 14 which are thus guided and which are pivoted at 15 to levers 16, the detents 14 being held toward the cylinder by springs 17, clearly shown in Figs. 4 and 6. The levers 16 are pivotally mounted at 18 and are normally held with their rear ends depressed by springs 19 as in Fig. 4. Engaging the forward portions of the levers 16 are stems 20 which extend vertically through perforations 21 in the top of the cabinet and through perforations 22 in a guide member 23 fastened to the front of the cabinet. The upper ends of the stems 20 are provided with knobs or buttons 24; the stems 20 and knobs 24 together constituting keys whereby to raise the rear ends of the levers 16 so as to raise the detents 14. The keys may be arranged in any suitable manner, and are preferably arranged the same as in typewriting machines, that is to say, in three banks or rows. The buttons 24 are marked with the various letters of the alphabet as indicated at 25 in Fig. 1, and preferably the arrangement of the letters on the knobs corresponds to the arrangement on the keys of typewriting machines. Thus the keys 20, 24, levers 16, detents 14 and notches 3 constitute means to move the member 2 step by step.

At one end the cylinder 2 may be provided with ratchet teeth 26 adapted to be engaged by a pawl roller 27 rotatively mounted on an arm 28 which is pivoted at 29 to the adjacent end of the cabinet. The arm 28 is normally held with the roller 27 engaging the cylinder by a spring 30 which is fastened to the arm and which is engaged by a tension adjusting screw 31 screw-threaded through the rear wall of the cabinet.

The opposite end of the cylinder may be provided with designatory characters 32 and in the instance shown in the drawings said characters are figures. These characters 32 are placed at intervals around the cylinder in accordance with certain requirements which will be described hereinafter. The reference characters 32 are visible one at a time, as the cylinder is rotated, through a window 33 near one end of the top of the cabinet. Adjacent the window 33 may be placed a list 34 of the words 35 to be spelled, and opposite each word on the list is a designatory character 36, the characters 36 corresponding to the characters 32. Thus if it is desired to spell "Tavern," see Fig. 3, the cylinder will be turned to expose the reference character 8 through the window.

In line with the ribs 6 and adapted to be engaged by the lugs 4 are latches 37 which are pivoted at 38. The latches 37 are provided with detents 39 adapted to extend in the path of travel of shoulders 40 on indicator members 41. The detents 39 are normally held to overhang the shoulders 40 by reason of springs 42 pressing the lower ends of the latches toward the cylinder.

The indicator members 41 may be of any suitable construction and in the drawings are shown in the form of vertically arranged bars shiftably mounted in ways 43 projecting inward from the back wall of the cabinet. The indicator members 41 tend to be raised to the elevated indicating position shown in Fig. 6 by springs 44 and said indicator members are provided near their upper ends with notches 45 adapted to be engaged by the rear ends of stops 46 so as to hold the indicator members down in non-indicating position against the pressure of the springs 44. When the stops 46 are engaged with the notches 45 the detents 39 are slightly spaced from the shoulders 40 of the indicator members. The stops 46 are normally held in notch-engaging position by springs 47.

The stops 46 may be in the form of flat rods and are provided at their forward ends with knobs or buttons 48. The knobs 48 are provided with designatory characters as indicated at 49 in Fig. 3. These characters 49 correspond with the characters 36 and 32.

The indicator members 41 may be plain and without designatory markings of any kind thereon, but, if desired, each indicator member may be provided with a signal or designatory card 50 bearing the image 51 and name 52 of the object represented by the image and name as clearly shown in Fig. 10.

In practice, the device operates as follows: The person using the device is instructed to spell the words indicated on the list 34 in the order there shown and the student will first withdraw the stop designated 1 from the notch 45 which it engages and he will then depress the knobs 24 of the appropriate keys lettered in the order of the lettering of the words in sequence to spell the first word on the list ("Quail" in this instance) and designated thereon as No. 1. The notches 3 of the cylinder are so arranged relative to the various detents 14 that the detent of the appropriate key, designated by the first letter of the word (in this instance Q) will engage one of the notches so that when said key is depressed it will cause the cylinder to be turned a step in its rotation to bring another of the notches 3 into registration with the appropriate detent of the key designated by the second letter of the word (in this instance "u"). This "u" key when depressed will thus cause the cylinder to be rotated another step and so on throughout the spelling of the word, each key moving the cylinder a step.

The depression of the key designated by the last letter of the word (in this instance "l") causes one of the lugs 4 to engage and trip one of the latches 37, the lugs being so arranged that the one opposite the latch for the indicator member in alinement with the stop having the same designatory character (in this instance "1") will cause operation of said latch. When the latch 37 is thus operated it releases the appropriate indicator member, whereupon the spring of said member will raise the same into the elevated indicating position shown in Fig. 6, thus indicating that the word has been correctly spelled by the student.

It is to be understood that the notches 3, lugs 4, and characters 32 may be so arranged on the cylinder that when the key designated by the last letter of any one of the words being spelled is depressed it not only causes release of the appropriate indicator member but also brings to view the designatory character 36 of the next succeeding word on the list 34, so that the words on the list can be spelled in sequence on the machine by first pulling out the stop designated by the same character as that visible through the window 33 and then depressing the keys in sequence according to the order of the letters of the word designated on the list by the same character as is on the stop.

Fig. 4 of the drawings indicates the "o" key in position about to be depressed to cause the indicator member of the word "Burro" to be released, as in Fig. 6, thus bringing the designatory figure 8 of the next word "Tavern" on the list into view through the window 33 to indicate to the student that he is next to pull out the stop marked 8 so as to release it from the shoulder 40 of the indicator adapted to indicate, when the student's spelling of the word "Tavern" on the machine is completed, that said spelling is correct.

Only one of the cylinders 2 is shown in the drawings, but it is understood that there may be a plurality of said cylinders with the notches 3 and lugs 4 differently arranged thereon so as to make possible the spelling on the machine of many more words than there are indicator members and stops. It is also understood that there will be as many different lists 34 of words as there are cylinders and that said lists will be interchangeable. It is thus clear that any desired number of different words may be readily spelled out on the machine and that when correctly spelled one of the indicator members will be automatically released so as to be moved into the elevated position shown in Fig. 6.

It is understood that the designatory characters on the key knobs may be omitted if it be desired to employ the, so termed, touch system of writing used extensively by typists.

I claim:

1. A device of the character described comprising a movably mounted step-motion member, means to move said member a step at a time for each of the various letters in sequence of a word, shiftably mounted indicator members independently of the step-motion member, and means operative by the step-motion member in its movement corresponding to the final letter of the word to cause the appropriate indicator member to move from non-indicating position to indicating position.

2. A device of the character described comprising shiftably mounted indicator members, means tending to move the indicator members from non-indicating position to indicating position, means releasably holding the indicator members in non-indicating positions, other means adapted to releasably hold the indicator members in non-indicating positions when the first named holding means are released, keys, and means operative by depression of certain of the keys in predetermined sequence to release the second named holding means of a predetermined one of the indicator members after the first named holding means therefor has been released.

3. A device of the character described comprising a movably mounted step-motion member, means to move said member a step at a time for each of the various letters in sequence of a word, shiftably mounted indicator members, means tending to move said indicator members from non-indicating positions to indicating positions, means to releasably hold the indicator members in non-indicating positions, and means operative by the step-motion member in its movement corresponding to the final letter of the word to release the holding means of a predetermined one of the indicator members.

4. A device of the character described comprising a movably mounted step-motion member, means to move said member a step at a time for each of the various letters in sequence of a word, shiftably mounted indicator members, means tending to move said indicator members from non-indicating positions to indicating positions, means to releasably hold the indicator members in non-indicating positions, other means adapted to releasably hold the indicator members in non-indicating positions when the first-named holding means are released, and means operative by the step-motion member in its movement corresponding to the final letter of the word to release the second named holding means of a predetermined one of the indicator members after the first named holding means therefor has been released.

5. A device of the character described comprising a rotatively mounted drum, keys, means operative by depression of certain of the keys in sequence to turn the drum step by step, and means operating independently of the drum when the drum has been turned to a predetermined position to indicate that the proper sequence has been observed in depressing the keys.

6. A device of the character described comprising a rotatively mounted drum, keys, means operative by depression of certain of the keys in sequence to turn the drum step by step, shiftable indicator members, and means operating independently of the drum when the drum has been turned a predetermined number of steps to cause a predetermined one of the indicator members to move from non-indicating position to indicating position.

7. A device of the character described comprising a rotatively mounted drum, keys, means operative by depression of certain of the keys in sequence to turn the drum step by step, shiftable indicator members, means tending to move the indicator members from non-indicating position to indicating position, means to releasably hold the indicator members against movement, and means operated by the drum when the drum has been turned a predetermined number of steps to release the holding means of a predetermined one of the indicator members.

8. A device of the character described comprising a rotatively mounted drum, keys, means operative by depression of certain of the keys in sequence to turn the drum step by step, shiftable indicator members, means tending to move the indicator members from non-indicating position to indicating position, means to releasably hold the indicator members against movement, other means to releasably hold the indicator members against movement when the first named holding means are released, and means operated by the drum when the drum has been turned a predetermined number of steps to release the second named holding means of a predetermined one of the indicator members.

9. A device of the character described comprising a rotatively mounted drum having notches in its periphery and having lugs projecting from its periphery, detents to engage the notches, levers to move the detents, keys to operate the levers, indicator members having notches and shoulders, means tending to move the indicator members from non-indicating position to indicating position, stops engageable with the notches of the indicator members, and latches having detents adapted to extend in the path of travel of the shoulders and adapted to be engaged by the lugs to cause retraction of the latches when the drum has been turned for that purpose.

10. A device of the character described comprising movably mounted indicator elements bearing images respectively of different things, a step-motion member, means to move the step-motion member a step at a time for each letter in sequence only in the names of said things, and means operative when the step-motion member has been moved a predetermined number of steps to cause a predetermined one of the indicator elements to move from non-indicating position to indicating position.

11. A device of the character described comprising a cabinet having a window, a step-motion member movably mounted in said cabinet and provided with different designatory characters visible one at a time through the window as the step-motion member is moved predetermined distances, means to move the step-motion member a step at a time for each of the letters in sequence of a word, indicator members, means to move the indicator members from non-indicating position to indicating position, stops releasably holding the indicator members in non-indicating position and provided with designatory characters corresponding to those on the step-motion member, other means to hold the indicator members in non-indicating position when the stops are released, and means operative by the step-motion member when the step-motion member has been moved the predetermined distance to release the second named holding means of the indicator members associated with the respective stops in accordance with the designatory characters on said stops.

12. A device of the character described comprising a movable mounted step-motion member having notches and having lugs, detents to engage the notches, levers to move the detents, keys to operate the levers, indicator members having notches and shoulders, means tending to move the indicator members from non-indicating position to indicating position, stops engageable with the notches of the indicator members, and latches having detents adapted to extend in the path of travel of the shoulders and adapted to be engaged by the lugs to cause retraction of the latches when the step-motion member has been turned for that purpose.

13. A device of the character described comprising a movably mounted step-motion member, keys, means operative by depression of certain of the keys in sequence to move the step-motion member step by step, and means operating independently of the step-motion member when the step-motion member has been moved to a predetermined position to indicate that the proper sequence has been observed in depressing the keys.

Signed at Los Angeles, California, this 28th day of September, 1917.

THOMAS J. DOYLE.

Witnesses:
 GEORGE H. HILES,
 L. BELLE WEAVER.